US011514629B2

(12) United States Patent
Doumi

(10) Patent No.: US 11,514,629 B2
(45) Date of Patent: Nov. 29, 2022

(54) CREATING A COLORCLOUD

(71) Applicant: L'OREAL, Paris (FR)

(72) Inventor: Mehdi Doumi, North Plainfield, NJ (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 17/107,168

(22) Filed: Nov. 30, 2020

(65) Prior Publication Data

US 2022/0172414 A1   Jun. 2, 2022

(51) Int. Cl.
*G06T 11/20* (2006.01)
*G06T 7/90* (2017.01)

(52) U.S. Cl.
CPC .............. *G06T 11/206* (2013.01); *G06T 7/90* (2017.01); *G06T 2200/24* (2013.01); *G06T 2207/10016* (2013.01); *G06T 2207/10024* (2013.01); *G06T 2207/30196* (2013.01)

(58) Field of Classification Search
None
See application file for complete search history.

(56) References Cited

U.S. PATENT DOCUMENTS

| 8,860,748 | B2* | 10/2014 | Campbell | G06K 9/66 345/593 |
| 9,984,307 | B2 | 5/2018 | Kato | |
| 2003/0065450 | A1* | 4/2003 | Leprince | A45D 44/005 702/19 |
| 2007/0031360 | A1 | 2/2007 | Gupta | |
| 2015/0091938 | A1* | 4/2015 | Mallick | G06K 9/38 345/595 |
| 2016/0071316 | A1* | 3/2016 | Beeler | G06T 17/20 345/423 |
| 2016/0112616 | A1* | 4/2016 | Bonifer | A45D 44/005 348/77 |
| 2016/0154993 | A1* | 6/2016 | Aarabi | H04N 1/4074 382/118 |
| 2016/0249849 | A1* | 9/2016 | Mihara | G01N 21/1717 600/306 |
| 2017/0032213 | A1* | 2/2017 | Sharma | G06K 9/4652 |
| 2017/0206678 | A1* | 7/2017 | Kowalczyk | G06K 9/6212 |

(Continued)

FOREIGN PATENT DOCUMENTS

WO   WO-2015082300 A1 *  6/2015 ............ G01J 3/0224

OTHER PUBLICATIONS

Meng et al.; "Smartphone based hand-held quantitative phase microscope using the transport of intensity equation method;" Lab on a Chip; 2017, 17, pp. 104-109; journal of The Royal Society of Chemistry 2017 (Year: 2017).*

(Continued)

*Primary Examiner* — Edward Martello
(74) *Attorney, Agent, or Firm* — Oblon, McClelland, Maier & Neustadt, L.L.P.

(57) ABSTRACT

A cradle can be used to capture video of an object, such as hair. That video can then be used to extract and visualize color information relating to that material using a colorcloud. The colorcloud contains all the colors that were present in one or more frames of the video. The cradle comprises a video recording device that is able to see the material through a window on the cradle. A smartphone can be used with the cradle to act as the video recording device, as well as provide lighting.

6 Claims, 10 Drawing Sheets

(56) References Cited

U.S. PATENT DOCUMENTS

2018/0140248 A1* 5/2018 Chandra .............. A61B 5/1034
2020/0225165 A1* 7/2020 Knuebel .............. G01N 21/359

OTHER PUBLICATIONS

Cheng et al.; "Thresholding Using Two-Dimensional Histogram and Fuzzy Entropy Principle;" IEEE Transactions on Image Processing, vol. 9, No. 4, pp. 732-735; Apr. 2000 (Year: 2000).*

Helton Jader Souza de Oliveira et al., "A handheld smartphone-controlled spectrophotometer based on hue to wavelength conversion for molecular absorption and emission measurements;" Sensors and Actuators B: Chemical vol. 238, Jan. 2017, pp. 1084-1091; Elsevier B.V. (Year: 2017).*

French Preliminary Search Report and Written Opinion dated Oct. 15, 2021 in French Patent Application No. 2101816 (with English translation of Category of Cited Documents), citing documents AA, AX, and AY therein, 9 pages.

Kai Uwe Barthel, "3D-Data Representation with Imaged," Retrieved from the Internet [URL: https://www.researchgate.net/profile/Kai-Barthel/publication/215458973_3D-Data-Representation-with-ImageJ/links/540daa810cf2f2b29a39ab8a/3D-Data-Representation-with-ImageJ.pdf], XP055851678, May 2006, 5 pages.

Alvaro Santamaria Herrero, "H3Stogram," Retrieved from the Internet [URL: https://web.archive.org/web/20200928024658/http://h3stogram.herokuapp.com/#help], XP055851684, Sep. 28, 2020, 3 pages.

International Search Report and Written Opinion dated Mar. 23, 2022 in Application No. PCT/US2021/061090.

* cited by examiner

CREATING A COLORCLOUD

BACKGROUND

Spectrophotometers are used to read the color of hair swatches, but it provides only a single digital representation of a material in the form of a single RGB, L*a*b*, LCh or HSV triplet, and typically only reads an area of less than 1 cm×1 cm. Further, when comparing two materials, the analysis is limited to euclidean distances in colorspace between 3-spaces (e.g. delta-E1976= $\sqrt{(L^*_2-L^*_1)^2+(a^*_2-a^*_1)^2+(b^*_2-b^*_1)^2}$), and this threshold for detection is not determined yet in hair color by humans. Furthermore, the single color (e.g. RGB or L*a*b*) is an average color of the region of measure, and an average color is not concrete, but rather a mathematical concept. Theoretically, for example, one may take the average color of a region of hair and that color may not even exist in that region of hair.

SUMMARY

In an aspect, the present disclosure is directed to, among other things, systems, devices, and methods for creating a 3-dimensional virtual representation, colorcloud, and the like for an object, a material, and the like from one or more digital images, video, optical sensor information, and the like.

The disclosure describes generating colorclouds for the object, wherein the colorcloud contains every color present in the one or more of the plurality of frames; and identifying characteristics of the hair using the colorcloud.

In one embodiment, the colorcloud contains a frequency of the every color present in the one or more of the plurality of frames.

One embodiment further comprises comparing a first colorcloud to a second colorcloud; and visualizing, from the comparing, similarities and differences between the first colorcloud and the second colorcloud.

One embodiment further comprises displaying the colorcloud in a color space.

In one embodiment, the characteristics of the hair comprise identifying a shine level.

Also disclosed is a system, comprising: a colorcloud unit including computational circuitry operably coupled to an image sensor and configured to generate a 3-dimensional virtual representation of color information associated with a plurality of digital images of an object; and a significant characteristic unit including computational circuitry to identify one or more significant characteristics of the object and to generate one or more virtual instances on a graphical user interface display indicative of the identity of a significant characteristic of the object based on one or more inputs associated with the 3-dimensional virtual representation of color information of the object.

In one aspect, the colorcloud unit including the computational circuitry configured to generate a 3-dimensional virtual representation of color information associated with the plurality of digital images of the object comprises computational circuitry configured to generate a 3-dimensional virtual representation of color information including regions indicative of a color frequency of occurrence, color variation, or color intensity distribution associated with the object.

In one aspect, the plurality of digital images of the object comprises a plurality of digital images of a hair; and wherein the colorcloud unit including the computational circuitry configured to generate a 3-dimensional virtual representation of color information associated with the plurality of digital images of the object comprises computational circuitry configured to generate a 3-dimensional virtual representation of hair color information associated the plurality of digital images of a hair.

In one aspect, the plurality of digital images of the object comprises a plurality of digital images of a hair; and wherein the colorcloud unit including the computational circuitry configured to generate a 3-dimensional virtual representation of color information associated with the plurality of digital images of the object comprises computational circuitry configured to generate a 3-dimensional virtual representation of hair color information and a 3-dimensional virtual representation of hair characteristic associated the plurality of digital images of a hair.

In one aspect, the colorcloud unit including the computational circuitry configured to generate a 3-dimensional virtual representation of color information associated with the plurality of digital images of the object comprises computational circuitry configured to generate a 3-dimensional virtual representation of color information including voxels with a varying intensity to indicate the color frequency of occurrence of a particular characteristic associated with the imaged object.

In another aspect, the plurality of digital images of the object comprises a plurality of digital images of a hair; and wherein the computational circuitry configured to generate a 3-dimensional virtual representation of color information including voxels with a varying intensity to indicate the color frequency of occurrence of a particular characteristic associated with the imaged object further includes computational circuitry configured to generate a 3-dimensional virtual representation of hair characteristic information including voxels indicative of gray hair coverage, shine, radiance, evenness associated the plurality of digital images of the hair.

DETAILED DESCRIPTION

This disclosure describes a physical device and a unique algorithm that can quantify the optical reflections of any material, such as hair swatches and real-life hair on human heads, in a way that is highly repeatable, portable, and can work in any lighting environment. The device, which will be referred to as a cradle, can be used on a material (like hair), and have the material analyzed with a colorcloud algorithm to obtain a holistic, digital representation of that material, defined herein as a colorcloud. This colorcloud can be compared to other colorclouds of other reflective materials, or the same reflective material at a different time point (e.g. colored hair before and after it has been washed). The embodiments disclosed herein extract the existing colors from video captures of materials (and does not manipulate them in any arithmetic way to produce a net result). The technique can use robust sets of color as its basis for detecting minute color changes.

Figure 1:
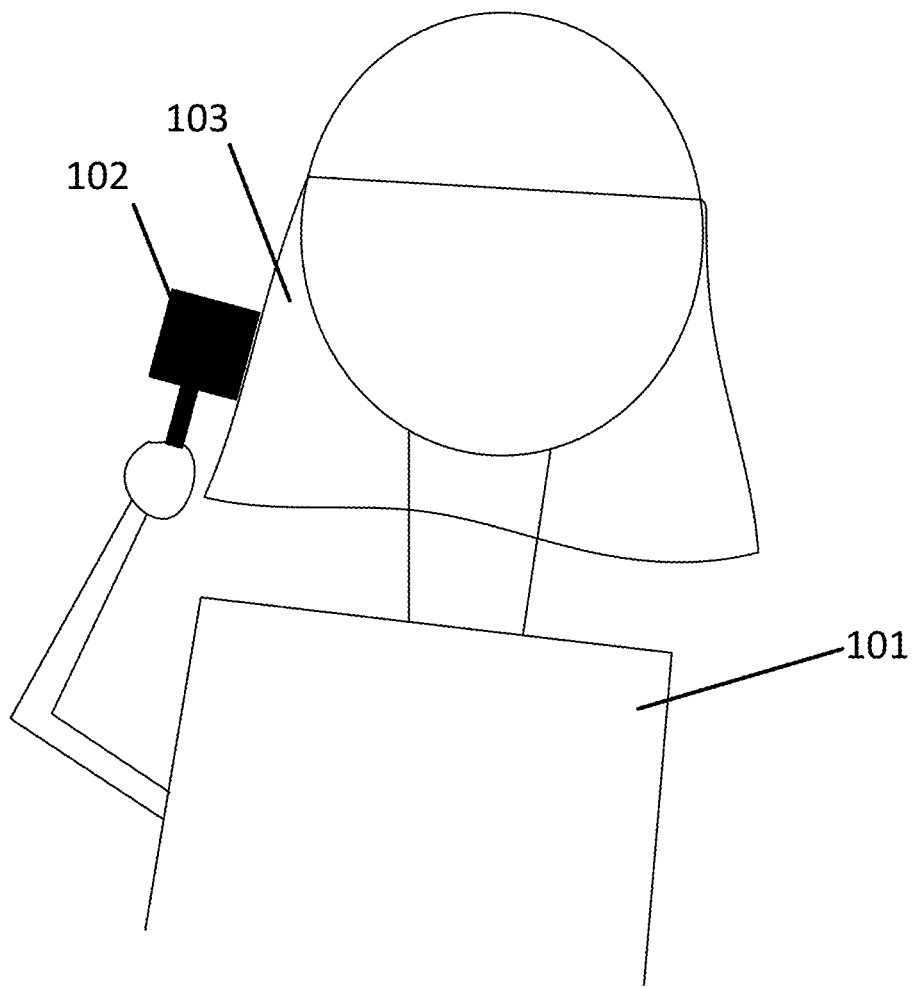
FIG. 1 shows a user dragging a cradle across their hair to capture a video and create a colorcloud for it.

FIG. 1 shows a use case in one embodiment. A user 101 can take the cradle 102, and drag it across their hair 103. As the cradle 102 is dragged across the user's hair 103, it can obtain video of the hair 103. This video can be analyzed using a colorcloud algorithm to produce a colorcloud.

Figure 2:
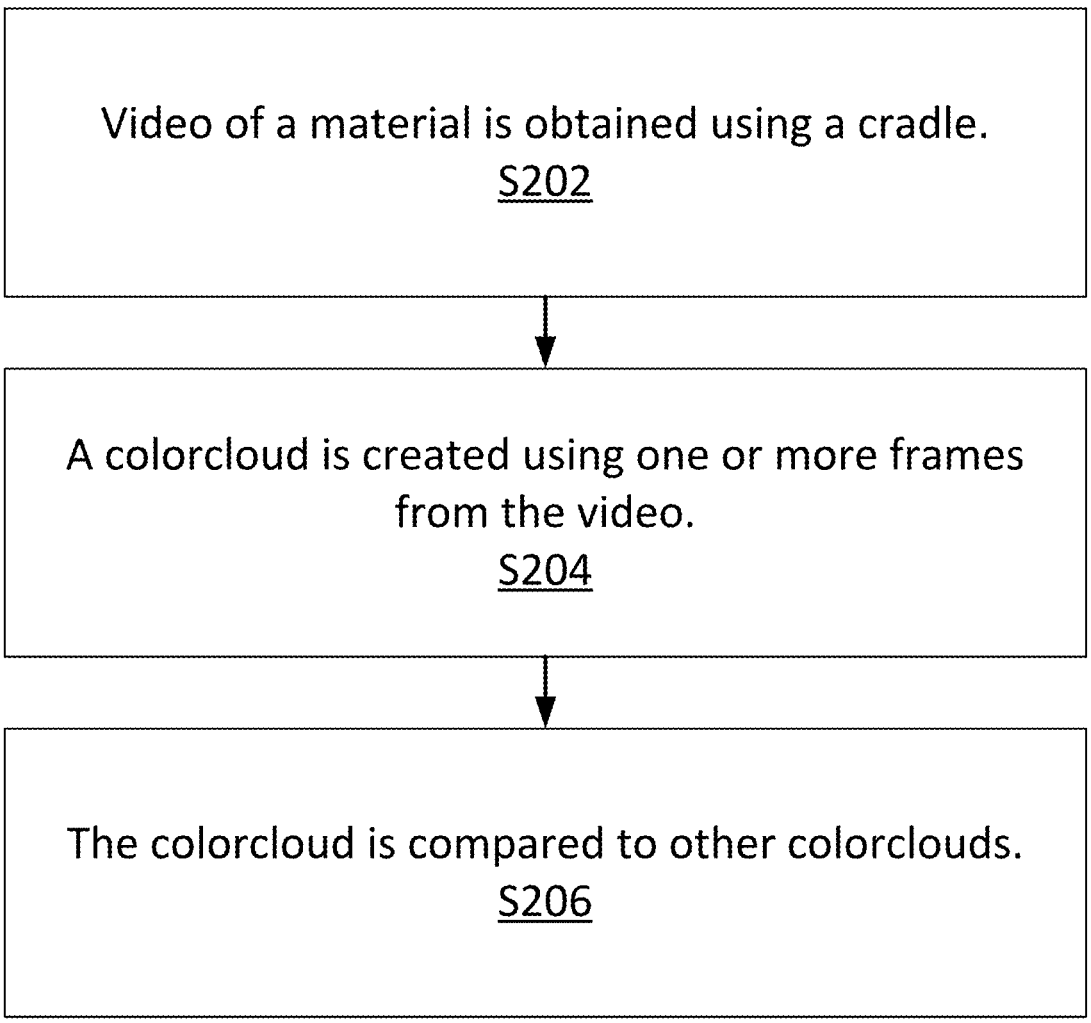
FIG. 2 shows one method of creating and utilizing a colorcloud.

FIG. 2 is a flowchart walking through one embodiment. In S202 video of a material, such as a user's hair, is obtained using a cradle. For example, to create a colorcloud for a user's hair, the user can run the cradle along the entire length of their hair (i.e. from the hair's root to tip). In S204, a colorcloud is created from one or more frames of the video. Essentially, all the colors that were in the one or more frames are extracted and shown in a colorcloud. In S206, the colorcloud is compared to other colorclouds. This comparing can be used for color matching and/or color differentiation.

Figure 3:
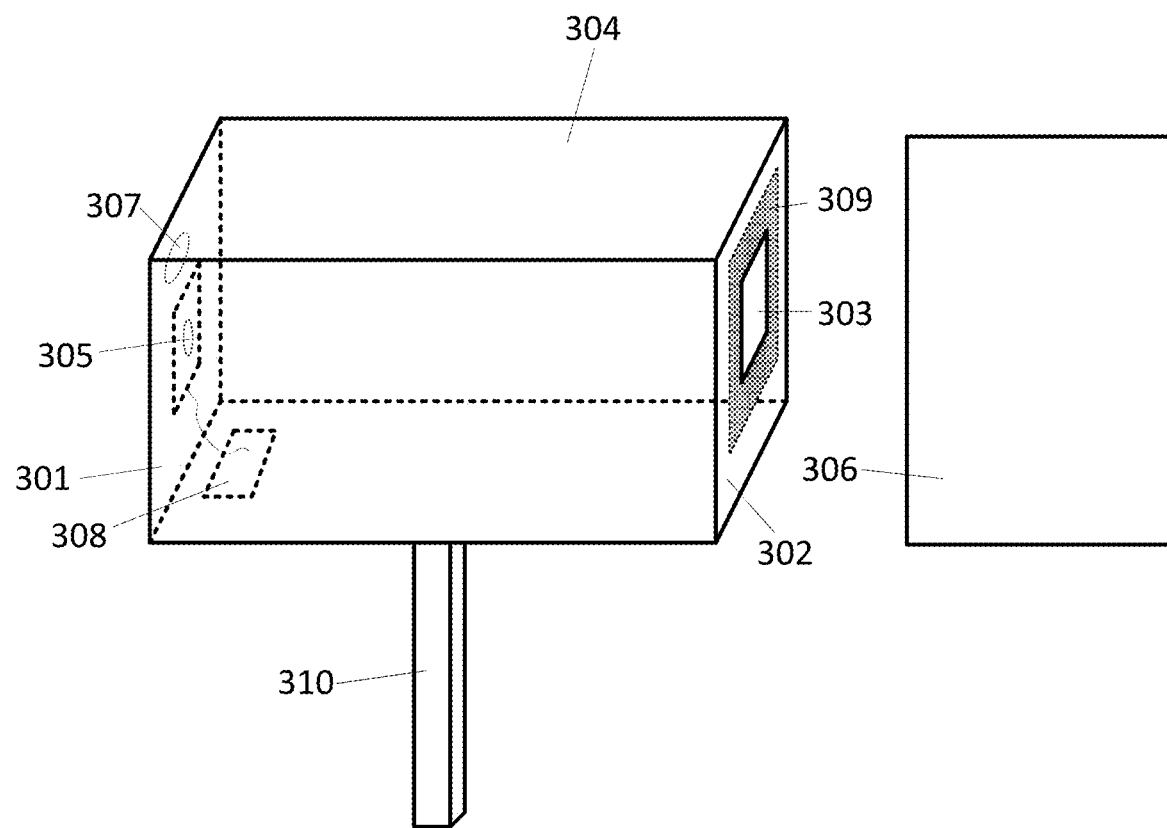
FIG. 3 shows a first embodiment of a cradle.

The cradle is an apparatus that enables one to capture video of a material so that a colorcloud of the material can be created. An example of a cradle is shown in FIG. 3 (solid lines represent the cradle's exterior, while dashed lines represent something interior). The cradle has a first end 301, a second end 302, a window 303 on the second end 302, and a wall 304 connecting the first end 301 to the second end 302. In one embodiment, the first end 301 and the second 302 end are at opposite ends of the cradle. An image sensor, such as a video recording device 305 can be attached to the first end 301 inside of the cradle to capture video of whatever material 306 (e.g. hair) is visible through the window 303. Further, the cradle can have processing circuitry 308 connected to the video recording device 305 and be configured to create a colorcloud from the video of the material 306, compare the created colorcloud to previous colorclouds, etc. The second end 302 of the cradle can be colored with a predetermined set of colors 309 adjacent to the window 303 for color separation when captured by the video recording device 305. The video can capture both the material 306 through the window 303, and the predetermined set of colors 309 adjacent to the window 303; then, the predetermined (i.e. known) colors can be used for reference when determining color of the material 306. A light 307 can also be attached to the cradle to provide a well-lit field of view from the video recording device 305 to the window 303. The cradle can be used to maintain a consistent distance between the video recording device 305 and the material 306 when taking a video. The cradle can also have a handgrip 310.

The processing circuitry 308 can comprise a colorcloud unit and a significant characteristic unit. The colorcloud unit can include circuitry coupled to an image sensor and be configured to generate a 3-dimensional virtual representation of color information associated with a plurality of digital images of an object, such as regions indicative of a color frequency of occurrence, color variation, or color intensity distribution associated with the object. The significant characteristic unit can include circuitry to identify one or more significant characteristics of the object and to generate one or more virtual instances on a graphical user interface display indicative of the identity of a significant characteristic of the object based on one or more inputs associated with the 3-dimensional virtual representation of color information of the object. In one embodiment, the object can be hair and the 3-dimensional virtual representation can be of hair color information and/or hair characteristic information associated with the plurality of digital images of the hair. Further, the 3-dimensional virtual representation can include voxels with a varying intensity to indicate the color frequency of occurrence of a particular characteristic associated with the imaged object. Examples of characteristic information includes object identification data, object characteristic data, color frequency of occurrence data, color variation data, color intensity data, presence of absence of a color data, frame by frame or pixel by pixel color analysis information, and the like. Non-limiting of color information can include hue, tint, tone, shade, and the like. In one embodiment, tint of a basic color is a lighter version of that color, and a shade is a darker version. In one embodiment, tone refers to the lightness (tint) or darkness (shade) of a basic color. If the image object is hair, the 3-dimensional virtual representation can include hair characteristic information including voxels indicative of gray hair coverage, shine, radiance, and evenness associated with the plurality of digital images of the hair. Examples of hair characteristics can include damage-state of hair, concentration of artificial-colorants, color distribution, gray coverage, texture, shine, distribution density, scalp characteristics, etc.

The cradle's main body in FIG. 3 was essentially a hollow rectangular prism with a window 303 on one end. In one embodiment, when the window 303 is covered, the only light inside the body of the cradle can be from the light 307. This can keep the lighting conditions within the cradle consistent. Moreover, in other embodiments, the cradle can have a different shape, such as a cylinder, cube, trapezoidal prism, etc. The cradle can also have a screen, which can be used to visualize the colorcloud.

Figure 4:
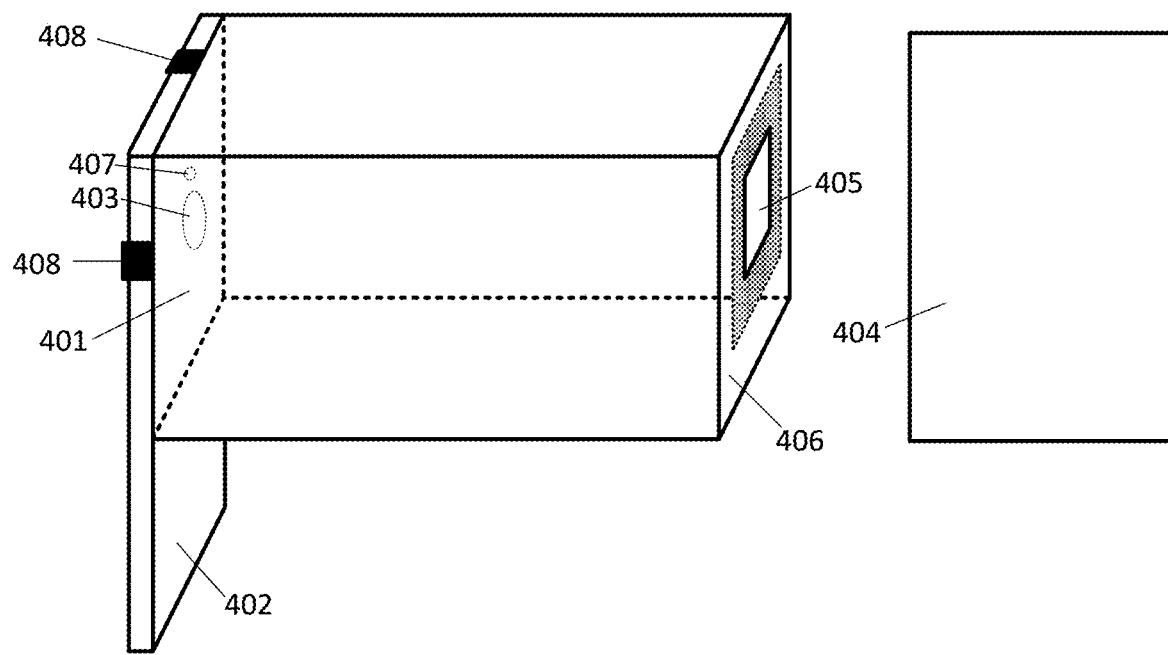
FIG. 4 shows a second embodiment of a cradle, where the cradle can be attached to a smartphone.

In one embodiment, the first end of the cradle can be configured to use the camera of a mobile device (e.g. smartphone) as the video recording device. An example is shown in FIG. 4, where the first end 401 of the cradle can be an attached smartphone 402. A camera 403 on the smartphone 402 can capture video of the material 404 through the window 405 on the second end 406. Further, processing circuitry already in the smartphone 402 can be used to create the colorcloud. The colorcloud and other related information can be visualized directly on the smartphone's screen. In addition, the smartphone's flash light 407 can be used to provide a well-lit field of view from the smartphone's camera 403 to the window 405. The cradle can also have a holder 408 that allows the smartphone 402 to be properly attached to the cradle when in use, and detached from the cradle when not in use.

The captured video can be of a material where a colorcloud is desired to be produced. The cradle should be held so that the video recording device can capture video of the material through the cradle's opening provided by the window. The window can be held directly against the material so that external light can be blocked from entering inside the cradle. An example of material can be hair on a head. In that case, the cradle can start by capturing video of the roots, and subsequently be dragged across the hair to the tips.

In one embodiment, the video, which comprises a plurality of frames, can be at least six seconds long and at least 60 frames per second. If video is captured of human hair or a hair swatch, this hair can be straight or curly.

Figure 5A:
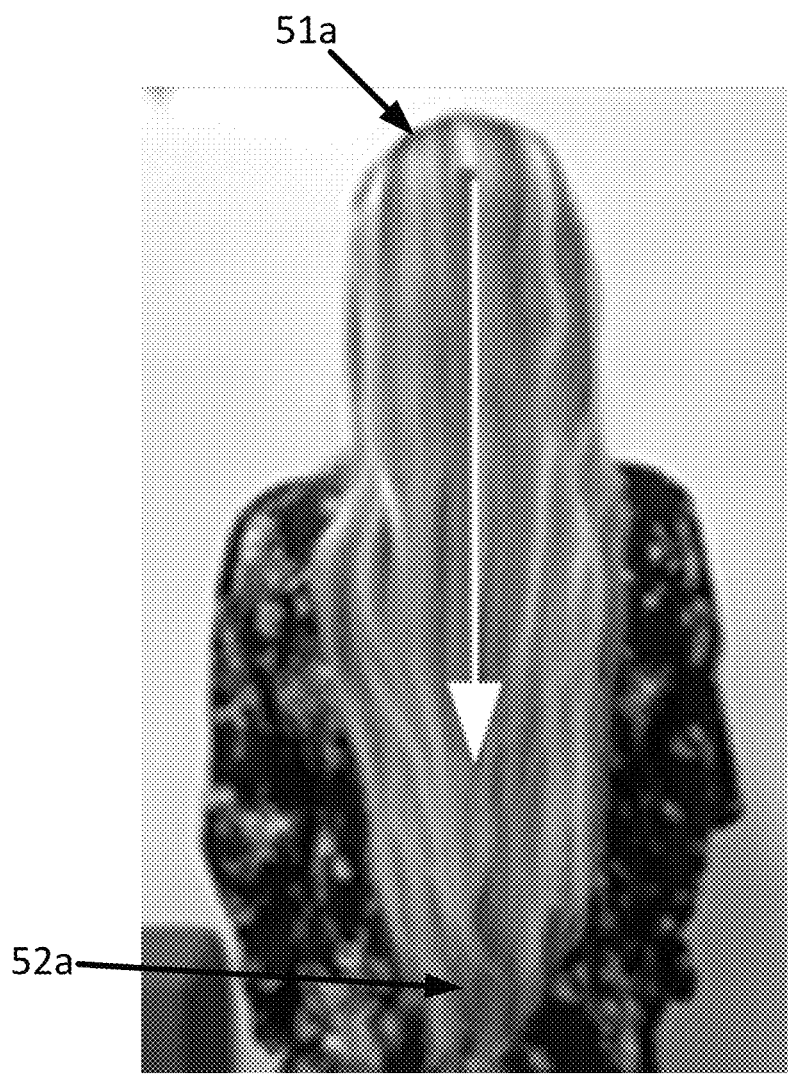
FIG. 5A shows a user's hair that was used for capturing a video, wherein the video captures across the length of the user's hair (starting from their hair roots and finishing at their hair tips).
Figure 5B:
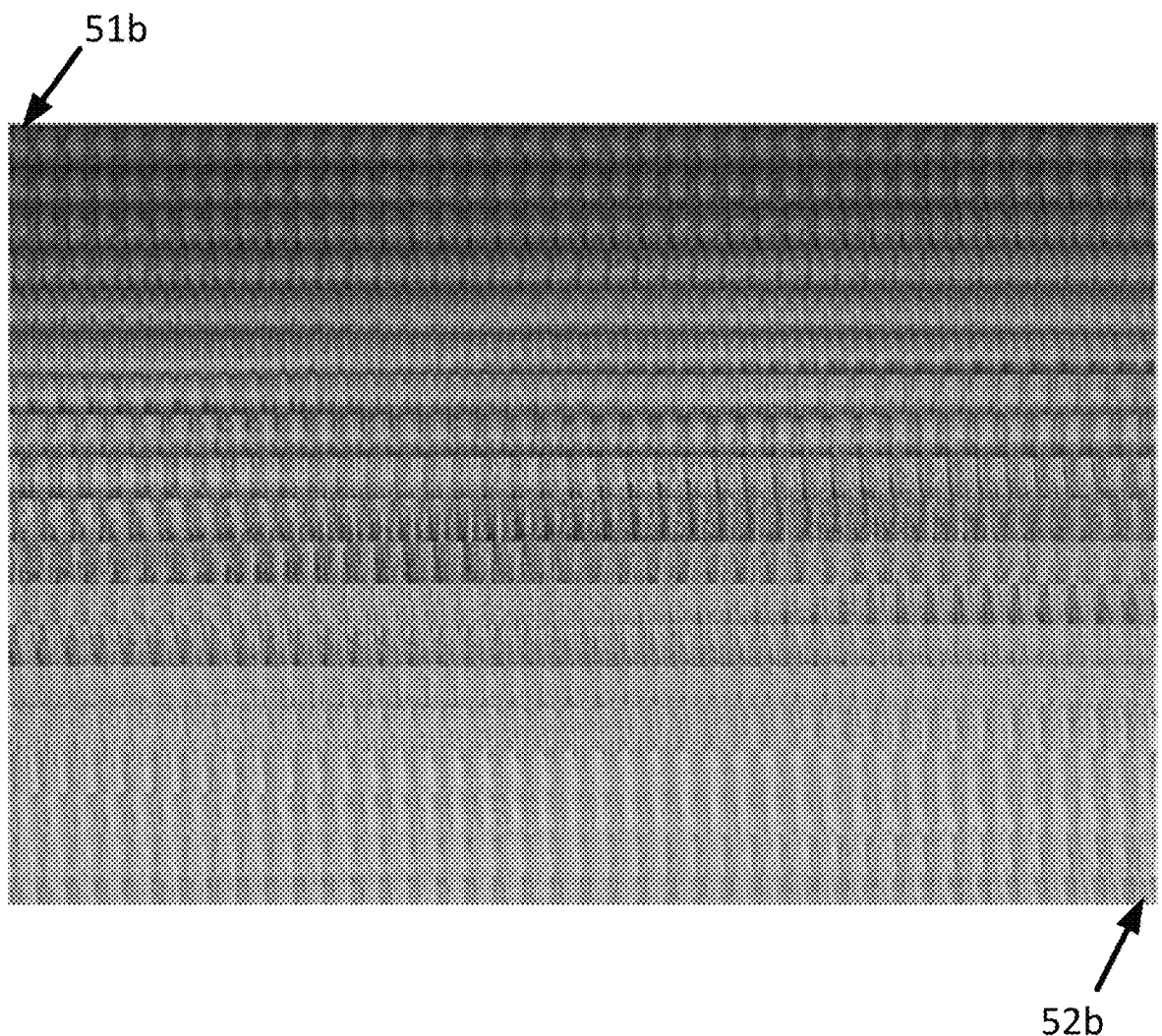
FIG. 5B shows an example of the plurality of frames of a video, laid out in chronological order, where a user captured video of their hair starting from their hair's roots and finishing at their hair's tips.

Obtaining a video of a material can include capturing video of someone's hair. An example is shown in FIG. 5A and FIG. 5B. First, referring to FIG. 5A, video is captured of the entire length of a model's hair, starting from their hair's roots 51a and progressing downwards towards their hair's tips 52a. FIG. 5B shows each frame of the captured video (from FIG. 5A) laid out in chronological order, where the top left frame 51b is of the hair's roots 51a and the bottom right frame 52b is of the hair's tips 52a. In another embodiment, obtaining video of a material can include capturing video of less than the entire length of someone's hair (e.g. only capturing half of someone's hair). Note that video can be captured in other directions besides downwards, such as progressing upwards or at an angle.

A colorcloud algorithm can be used to create, from one or more frames of the video, a colorcloud. The colorcloud algorithm can extract color information from the one or more frames. A colorcloud contains every color present in the one or more of the plurality of frames. In another embodiment, a colorcloud contains every color present in the one or more of the plurality of frames, and a frequency of the every color present in the one or more of the plurality of frames. In another embodiment, a colorcloud contains every color present in the one or more of the plurality of frames, and a frequency of every color present in the one or more of the plurality of frames, wherein the frequency exceeds a minimum predetermined threshold.

In one embodiment, the colorcloud algorithm can produce a colorcloud by extracting all the colors from a single frame of the video. For example, in FIG. 5B, an individual colorcloud can be created for each frame. A colorcloud created for each frame could include all the colors present in that single frame, and, in another embodiment, the frequency of each color present in that single frame.

In another embodiment, the colorcloud algorithm can produce a colorcloud by extracting the cumulative colors from a group of frames in the video (rather than from a single frame). For example, referring back to FIG. 5B, a colorcloud can be produced for each group of 10 frames, where the colorcloud created for each group of 10 frames includes all the colors presents in that particular group of 10 frames, and, in another embodiment, the frequency of each color present that group of 10 frames.

Figure 6:
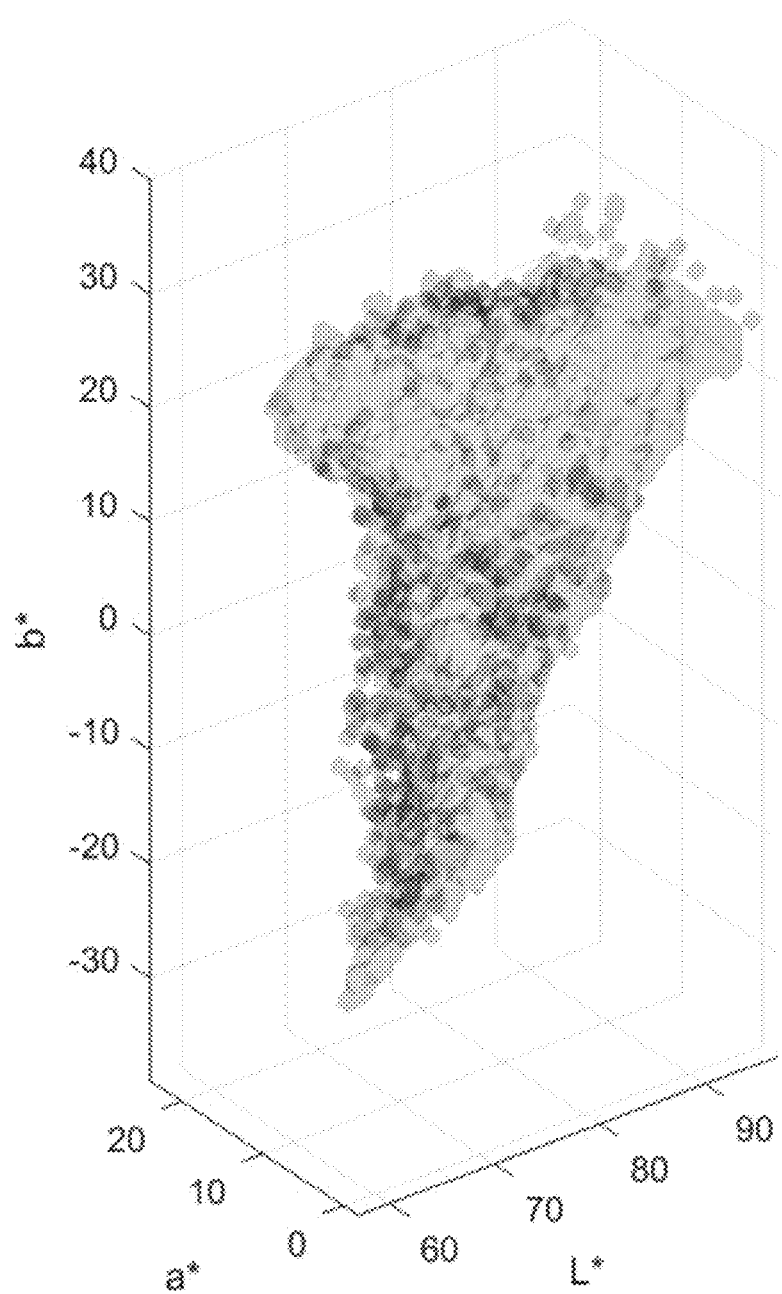
FIG. 6 shows an example of a single colorcloud that displays all the colors from every frame of a video.

An example of a colorcloud is shown in FIG. 6, where the colorcloud displays every color across all the frames of a video using a colorspace. Because videos are time-based, choosing specific frames can allow a colorcloud to be made at a specific point in time and/or range in time.

Once the colorcloud algorithm has extracted all the colors from one or more frames of a video, the colorcloud can be displayed in a myriad of forms. For example, colors can be displayed in a colorspace; the colorspace could use coordinates such as L*a*b*, RGB, LCh, HSV, etc. to convey color information.

Figure 7:
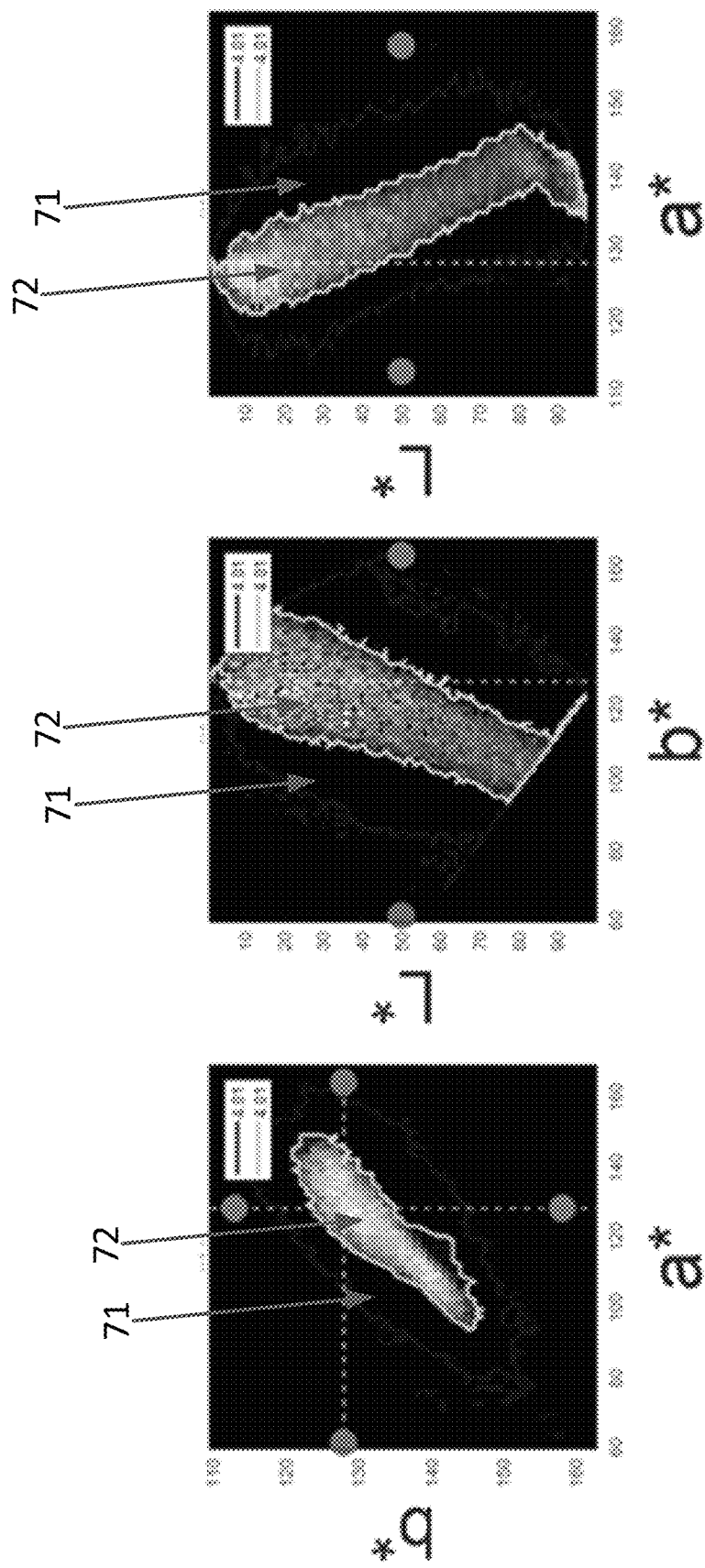
FIG. 7 shows examples of colorclouds that have color information and frequency information.

In another embodiment, the colorcloud can include the frequency (i.e. number of times) each color was present in the one or more frames of a video. An example is shown in FIG. 7, where the brighter a pixel is, the higher the frequency of the color represented by that pixel, and vice versa. The outer colorcloud 71 (i.e. full colorcloud) captures every color that was present in the one or more frames, while the inner colorcloud 72 (i.e. optimized colorcloud) captures the colors that were present at a higher frequency. The threshold to determine whether a color is present as a higher frequency can be adjusted depending on the application. In one instance, only the inner colorcloud 72 is used, and the low frequency (i.e. low-information) colors are removed as noise.

In another embodiment, the colorcloud can be used to identify characteristics of hair, such as gray hair coverage, shine, radiance, evenness, glow, etc. For example, color and frequency information from a colorcloud can be used to filter "low-information" colors and enhance the detection of colors to extract the amount of gray hair someone has. As another example, the shine level of hair can be calculated by looking at the average, variance, and spatially-connected clusters of L* value in the hair's colorcloud; high variability suggests a wide range of L* values from dark to bright, and spatially-connected, high L* values suggest a band of shine, both information, when combined, relate to the human perception of shine.

Figure 8:
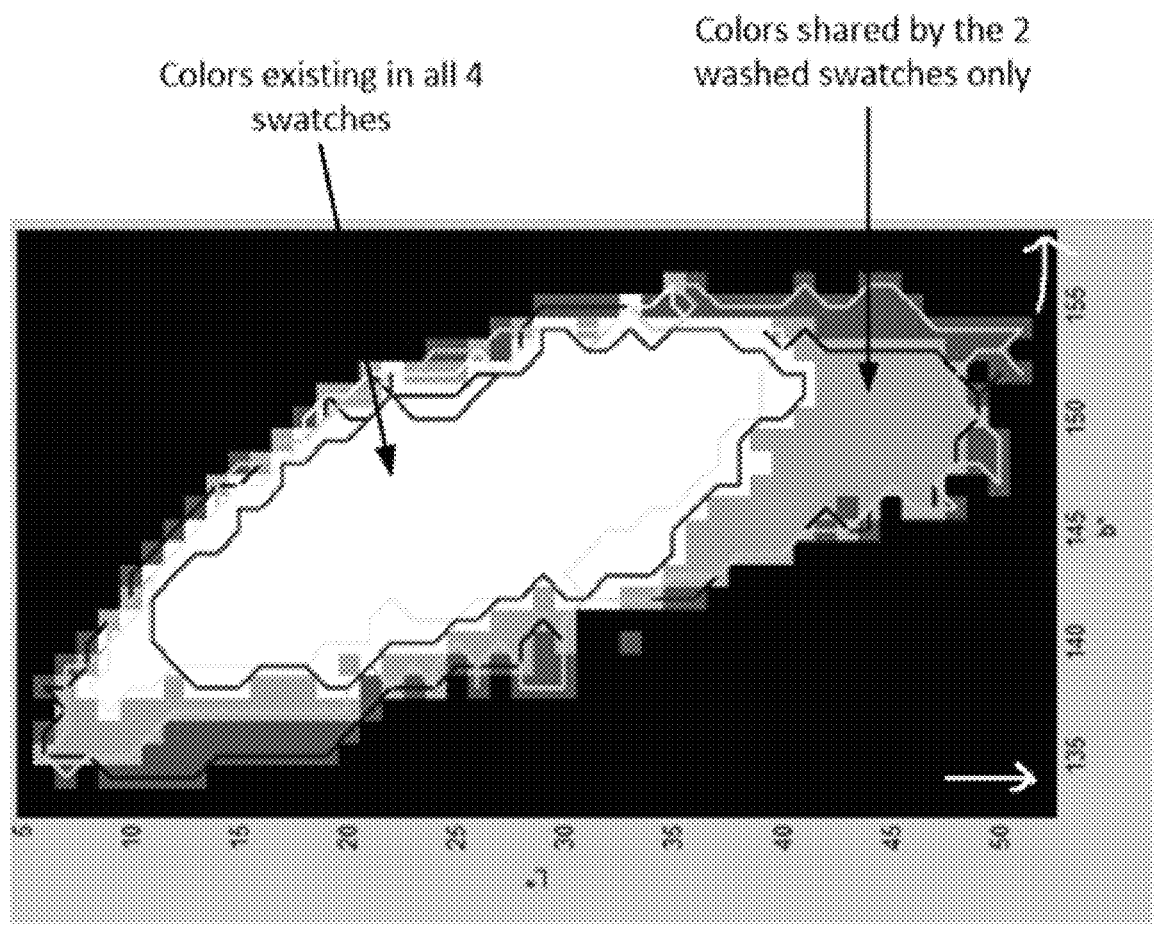
FIG. 8 shows an example of four different colorclouds created from swatches, which are then overlaid in the L*a*b* colorspace (projected on the L* and b* dimensions) to visualize their similarities and differences.

The colorcloud can be compared to other colorclouds to identify similarities and differences. This can enable color change detection and color matching. An example of comparing to other colorclouds is shown in FIG. 8. Colorclouds are produced for two unwashed swatches and those same two swatches after they have been washed. The portions of the colorclouds that overlap indicate similarity in color (i.e. colors that exist in both swatches) and the portions that don't overlap indicate differences in color (i.e. color that are not shared between swatches). This technique quantifies the overlapping and non-overlapping of groups of colors groups in colorspace (e.g. number of, group similarity, average color of group).

Figure 9:
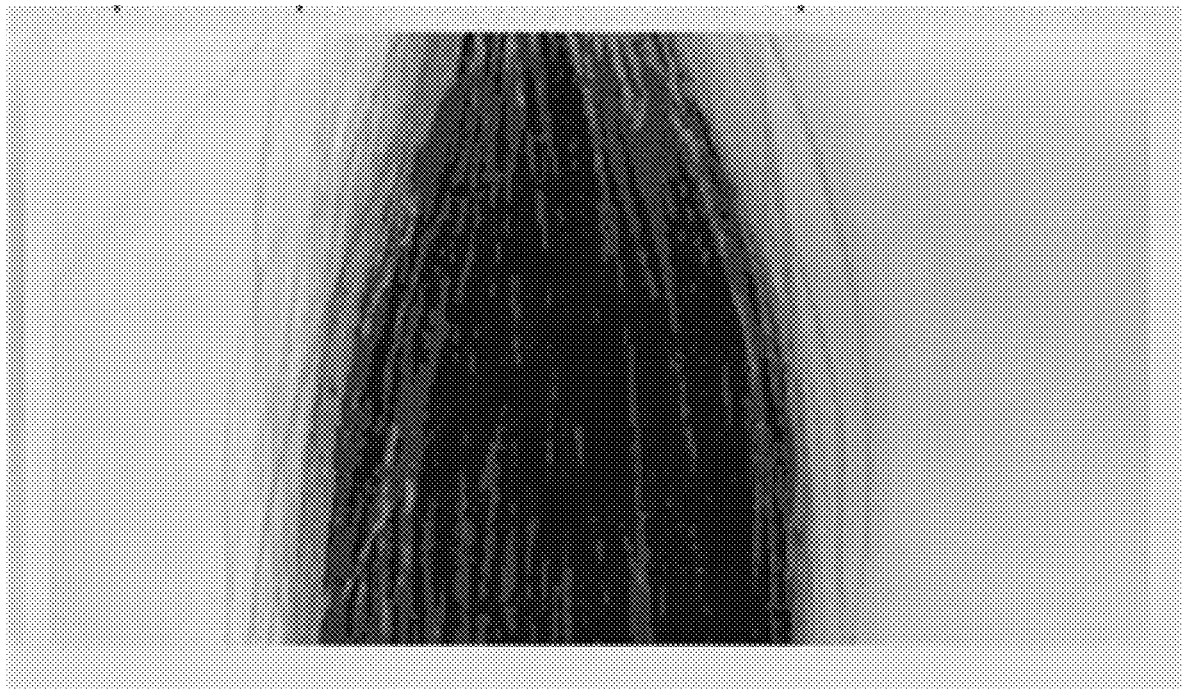
FIG. 9 shows shared colors and unique colors between different hair directly on a video.

Furthermore, similarities and differences between hair color can be visualized back onto the video. An example is shown in FIG. 9, where colorclouds were made for a swatch before and after washing. The darker areas on the hair indicate shared colors, while the lighter areas indicate unique colors. The similarities and differences between these colorclouds can be identified and visualized directly on the swatch. In other words, the user can replay one of the videos used for capturing the hair, and the similarities/differences can be shown directly on the hair of the video. This is done by simply matching the color of a video-pixel to the color contained in either of the two different colorclouds or the overlap of the two different colorclouds. For example, the color of a video-pixel that matches any of the colors within the colorcloud-overlap or colorcloud-intersection would be colored a dark color in the visualization video.

In another embodiment, an atlas of hair swatches can have a directory of colorclouds created for each hair swatch. Any subsequent captures of hair can then have a colorcloud produced and compared to the swatches in the atlas to determine the closest match (i.e. most similar in color). For good differentiation, swatches should be more similar to themselves than to other swatches.

The techniques mentioned herein can capture a large range of reflection (e.g. from hair swatches and hair head) to measure precisely and robustly heterogenous materials, like color, and measure precisely and robustly hair color change.

Applications of these techniques can include measuring color change more precisely and reproducibly than state-of-the-art instrumentations (e.g. spectrophotometers), measure color of human hair (like a hair colorist would do), measure gray coverage (e.g. measure the amount of gray in someone's roots to indicate how much hair color product to use), measure health of hair (e.g. based on shine level, where too low a shine can indicate dullness and suggest damaged hair), dynamic visualizations of hair before and after coloring and/or washing, etc. The techniques mentioned herein can also allow at-home consumer color evaluation, at-store display and visualization, and at-home consumer product recommendation. For example, a consumer can download an app on their phone to capture video and have a colorcloud created. The app could further recommend hair products based on certain characteristics of hair (e.g. can recommend a specific hair color product based on the user's hair color, gray level, and a survey performed on the app). Further, the cradle can have the capability to be portable (e.g. foldable cardboard cradle, 3D printed cradle, etc.).

The invention claimed is:

1. A method of creating a colorcloud for a material, comprising:
   obtaining a video of the material, wherein the video comprises a plurality of frames and the material is hair of a user, and the video is based on an image sensor moving across the hair of the user;
   creating, based on one or more of the plurality of frames, a colorcloud for the material, wherein the colorcloud contains every color present in the plurality of frames; and
   identifying characteristics of the hair using the colorcloud,
   wherein the colorcloud contains a frequency of every color present in the plurality of frames, the frequency being a number of times each color was present in the plurality of frames, and
   the colorcloud includes an outer colorcloud and an inner colorcloud, where the outer colorcloud captures every color that was present in the plurality of frames, while the inner colorcloud captures colors that were present at a frequency higher than a threshold frequency indicating that the inner colorcloud colors are present in the plurality of frames a number of times higher than a threshold number, and the outercloud is shown as surrounding the inner colorcloud in a two-dimensional image.

2. The method of claim 1, further comprising:
   displaying the colorcloud in a color space.

3. The method of claim 1, wherein the characteristics of the hair comprise identifying a shine level.

4. A system for creating a colorcloud for a material, comprising:
   processing circuitry configured to,
   obtain a video of the material, wherein the video comprises a plurality of frames and the material is hair of a user, and the video is based on an image sensor moving across the hair of the user;
   create, based on one or more of the plurality of frames, a colorcloud for the material, wherein the colorcloud contains every color present in the plurality of frames; and
   identify characteristics of the hair using the colorcloud,
   wherein the colorcloud contains the frequency of every color present in the plurality of frames, the frequency being a number of times each color was present in the plurality of frames, and
   the colorcloud includes an outer colorcloud and an inner colorcloud, where the outer colorcloud captures every color that was present in the plurality of frames, while the inner colorcloud captures colors that were present at a frequency higher than a threshold frequency indicating that the inner colorcloud colors are present in the plurality of frames a number of times higher than a threshold number, and the outercloud is shown as surrounding the inner colorcloud in a two-dimensional image.

5. The system of claim 4, wherein the processing circuitry is further configured to display the colorcloud in a color space.

6. They system of claim 4, wherein the characteristics of the hair comprise identifying a shine level.

* * * * *